(12) United States Patent
Inoue

(10) Patent No.: US 12,596,466 B2
(45) Date of Patent: Apr. 7, 2026

(54) INFORMATION PROCESSING APPARATUS, CONTROLLING METHOD, AND STORAGE MEDIUM

(71) Applicant: CANON KABUSHIKI KAISHA, Tokyo (JP)

(72) Inventor: Kenta Inoue, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 18/450,162

(22) Filed: Aug. 15, 2023

(65) Prior Publication Data

US 2024/0069696 A1     Feb. 29, 2024

(30) Foreign Application Priority Data

Aug. 25, 2022     (JP) ................................. 2022-134095

(51) Int. Cl.
G06F 3/0483     (2013.01)
G06F 3/0482     (2013.01)

(52) U.S. Cl.
CPC .......... *G06F 3/0483* (2013.01); *G06F 3/0482* (2013.01)

(58) Field of Classification Search
CPC .. G06F 3/0483; G06F 3/0482; H04N 1/00411
See application file for complete search history.

(56) References Cited

U.S. PATENT DOCUMENTS

| | | | | |
|---|---|---|---|---|
| 6,809,724 | B1 * | 10/2004 | Shiraishi | G06F 1/1684 345/157 |
| 11,265,431 | B2 | 3/2022 | Inoue | H04N 1/00411 |
| 2011/0239124 | A1 * | 9/2011 | Tsujimoto | H04L 67/02 715/741 |
| 2012/0268784 | A1 * | 10/2012 | Mori | H04N 1/00244 358/1.15 |
| 2019/0089850 | A1 * | 3/2019 | Tojo | H04N 1/00395 |
| 2020/0304684 | A1 * | 9/2020 | Abe | H04N 1/00411 |

FOREIGN PATENT DOCUMENTS

JP     2011-206962     10/2011

* cited by examiner

*Primary Examiner* — Cao H Nguyen
(74) *Attorney, Agent, or Firm* — Venable LLP

(57)     ABSTRACT

There are provided an information processing apparatus, a controlling method, and a storage medium, which are capable of suppressing a decrease in operating efficiency in a case of using an external service. To this end, connection to an external service is established based on connection information associated with a menu screen to be displayed on a display unit.

17 Claims, 9 Drawing Sheets

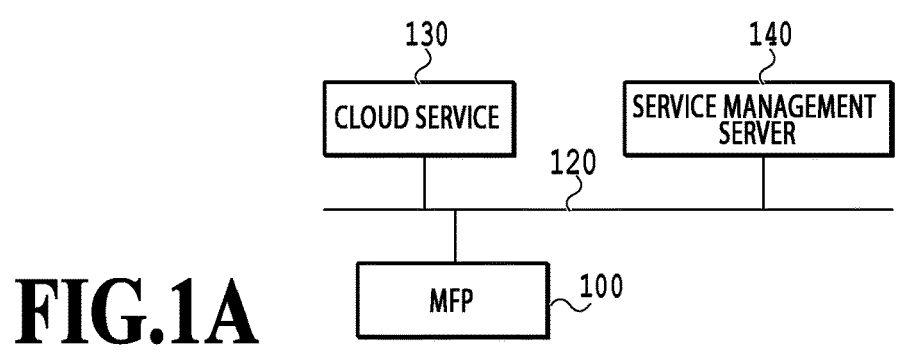

130

CLOUD SERVICE

140

SERVICE MANAGEMENT SERVER

MFP   100

100

CPU 101

102   ROM     RAM   103

104   IMAGE MEMORY     DATA CONVERSION UNIT   105

106   READING CONTROL UNIT     OPERATION DISPLAY UNIT   108

107   READING UNIT     LCD   109

120: COMMUNICATION NETWORK

110   COMMUNICATION CONTROL UNIT     RESOLUTION TRANSFORMATION UNIT   111

112   ENCODING-DECODING UNIT     PRINTING CONTROL UNIT   113

118   NON-VOLATILE MEMORY     PRINTING UNIT   114

115   USB FUNCTION CONTROL UNIT     USB HOST CONTROL UNIT   116

117

USB INTERFACE

| SCENE | STANDARD | WORK | STUDY | LIFE |
|---|---|---|---|---|
| TAB | 0 | 1 | 2 | 3 |
| CLOUD A | | | 12345@clouda.com. Cookie PRESENT | |
| CLOUD B | | | 67890@cloudb.com. Cookie PRESENT | |
| CLOUD C | | | | |

| SCENE | STANDARD | WORK | STUDY | LIFE |
|---|---|---|---|---|
| TAB | 0 | 1 | 2 | 3 |
| CLOUD A | | abcde@clouda.com. Cookie PRESENT | 12345@clouda.com. Cookie PRESENT | |
| CLOUD B | | | 67890@cloudb.com. Cookie PRESENT | |
| CLOUD C | | | | |

INFORMATION PROCESSING APPARATUS, CONTROLLING METHOD, AND STORAGE MEDIUM

BACKGROUND OF THE INVENTION

Field of the Invention

The present invention relates to an information processing apparatus to be used by being connected to an external service, a controlling method, and a storage medium.

Description of the Related Art

A technique for improving convenience in a case of using a service has been known. Japanese Patent Laid-Open No. 2011-206962 discloses a method that retains connection information on an external service while linking the connection information with authentication information on a user of an MFP, thus enabling the use of the external service without requiring at the time of using the service for the second time and so on.

However, according to the method disclosed in Japanese Patent Laid-Open No. 2011-206962, the user has to display a log-in screen at the start of using the MFP and to carry out a log-in operation. Moreover, in a case of changing the user, the original user has to log out once and then a different user has to log in. Meanwhile, in an environment that does not require a high degree of security such as in the case of the use at home, it is cumbersome to perform an authentication operation every time on the log-in screen and such an operation may decrease operating efficiency.

SUMMARY OF THE INVENTION

The present invention therefore provides an information processing apparatus, a controlling method, and a storage medium, which are capable of suppressing a decrease in operating efficiency in a case of using an external service.

An information processing apparatus of the present invention includes: a display control unit capable of selectively displaying a plurality of menu screens on a display unit; a switching unit configured to switch one of the menu screens displayed on the display unit to another one of the menu screens; an association unit configured to associate each of the plurality of menu screens with connection information to establish connection to an external service; and a connection unit configured to establish connection to the external service based on the connection information associated with the menu screen displayed on the display unit.

According to the present invention, it is possible to provide an information processing apparatus, a controlling method, and a storage medium, which are capable of suppressing a decrease in operating efficiency in a case of using an external service.

Further features of the present invention will become apparent from the following description of exemplary embodiments with reference to the attached drawings.

BRIEF DESCRIPTION OF THE DRAWINGS

FIG. 1A is a block diagram showing schematic configurations of an MFP and a system to which the MFP is connected;

FIG. 1B is another block diagram showing the schematic configurations of the MFP and the system to which the MFP is connected;

DESCRIPTION OF THE EMBODIMENTS

An embodiment of the present invention will be described below with reference to the drawings.

Figure 1C:
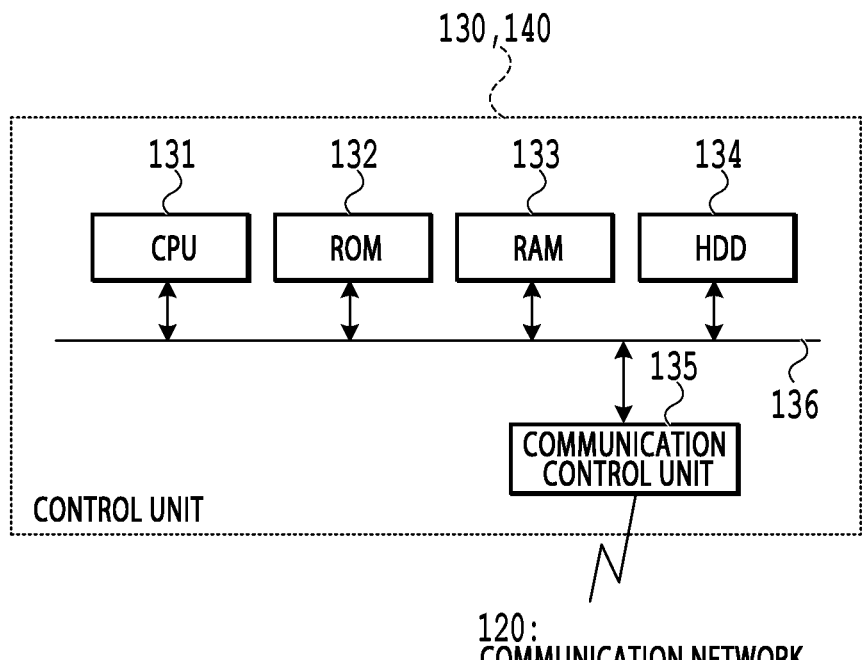
FIG. 1C is another block diagram showing the schematic configurations of the MFP and the system to which the MFP is connected.

FIGS. 1A to 1C are block diagrams showing a schematic configuration of a multifunction peripheral (MFP) 100 and a system to which the MFP 100 is connected. The system configuration in FIG. 1A includes the MFP 100, a cloud service 130, and a service management server 140, which are connected to one another through a communication network 120. The MFP 100 is one type of an information processing apparatus. Meanwhile, the MFP 100 is one type of an electronic device. The MFP 100 of the present embodiment is provided with information processing functions such as generation, storage, transmission, and the like of device information inclusive of log information and status information. Moreover, the MFP 100 includes an image formation function to form an image on a print medium by using a printing control unit 113 and a printing unit 114 to be described later.

The MFP 100 in FIG. 1B includes a CPU 101, a ROM 102, a RAM 103, an image memory 104, a data conversion unit 105, a reading control unit 106, a reading unit 107, an operation display unit 108, an LCD 109, a communication control unit 110, and a resolution transformation unit 111. The MFP 100 further includes an encoding-decoding unit 112, the printing control unit 113, the printing unit 114, a USB function control unit 115, a USB host control unit 116, a bus 117, and a non-volatile memory 118.

The CPU 101 is a system control unit that controls the entire MFP 100. The ROM 102 is a non-volatile memory that stores fixed data including control programs to be executed by the CPU 101, data tables, an embedded operating system (OS), and the like.

In the present embodiment, the respective control programs stored in the ROM 102 undergo software execution control such as scheduling, task switching, and interrupt processing under the supervision of the embedded OS stored in the ROM 102. The ROM 102 stores information indicating a state of permission that indicates whether or not to deliver device information to outside. The RAM 103 is formed from a device such as a static random access memory (SRAM) that requires a backup power supply. Power supply to the RAM 103 is guaranteed by a not-illustrated primary battery for data backup. Program control variables and the like are stored in the RAM 103.

The image memory 104 is formed from a device such as a dynamic random access memory (DRAM) and is capable of accumulating image data. Moreover, a certain area of the image memory 104 is secured as an operating area for executing the software processing. The data conversion unit 105 can perform conversion of image data such as an analysis of a page description language (PDL) and computer graphics (CG) development of character data.

The reading unit 107 optically reads an original with a CIS image sensor and converts the read original into an electrical image signal. The reading control unit 106 subjects this image signal to a variety of image processing such as binarization processing and halftone processing, thereby outputting high-definition image data. Here, the method of optically reading the original may be either a sheet reading control mode of reading the original with the fixed CIS image sensor or a book reading control mode of reading the original fixed to a platen with the movable CIS image sensor.

The operation display unit (inclusive of a display control unit) 108 can selectively display a home screen and the like, and is formed from bare essentials of keys including numerical value input keys, mode setting keys, a select kay, a cancel key, and the like, light emitting diodes (LEDs), seven-segment display units, and so forth. The various keys mentioned above are realized by so-called soft keys displayed on the LCD 109, so that the soft keys can accept an operation by a user. In order to save power consumption, the LCD 109 switches off backlight for the LCD 109 in a case where the user does not perform any operations for a predetermined period of time. The following description will be given on the assumption that screens are displayed on the operation display unit 108.

The communication control unit 110 controls communication between the MFP 100 and the communication network 120, and conducts connection to an Internet service provider, connection to the cloud service 130, communication of various data to and from the service management server 140, and so forth. Moreover, the communication control unit 110 can determine whether the MFP 100 is connected to the Internet or the MFP 100 is connected only to a LAN. Here, connection between the communication control unit 110 and the communication network 120 is assumed to be established based on a publicly known method such as the HTTP and XMPP. The resolution transformation unit 111 performs resolution transformation processing such as interconversion between millimeter-based image data and ink-based image data.

Note that the resolution transformation unit 111 can also execute scaling processing of the image data. The encoding-decoding unit 112 subjects the image data (uncompressed, MH, MR, MMR, JBIG, JPEG, and so forth) treated by the MFP 100 to encoding and decoding processing as well as the scaling processing. The printing control unit 113 subjects the image data to be printed to a variety of image processing such as smoothing processing, print density correction processing, and color correction, thereby converting the image data into high-definition image data and outputting the high-definition image data to the printing unit 114. Moreover, the printing control unit 113 also plays a role for regularly obtaining status information data on the printing unit 114. The printing unit 114 is formed from a laser beam printer, an ink jet printer, or the like and prints the image data generated by the printing control unit 113 on a print medium such as a paper sheet.

The USB function control unit 115 conducts protocol control in accordance with a USB communication standard. The USB host control unit 116 is a control unit for carrying out the communication in accordance with the protocol defined by the USB communication standard. This USB communication standard is a standard for bidirectional high-speed data communication. According to this USB communication standard, it is determined that two or more hubs or functions (slaves) can be connected to one host (a master). That is to say, the USB host control unit 116 provides a function as a host in the USB communication.

The non-volatile memory 118 is a non-volatile memory that stores data obtained from the network, settings of the information processing apparatus, and the like. Structures other than the reading unit 107 and the LCD 109 are connected to one another through the bus 117. The operation display unit 108 includes a screen in a tab format.

FIG. 1C is a block diagram showing a schematic configuration example of a control unit of the cloud service 130 and of the service management server 140. In each of the cloud service 130 and the service management server 140, a CPU 131, a ROM 132, a RAM 133, an HDD 134, and a communication control unit 135 are connected to another through a bus 136. The CPU 131 controls entire operations by reading control programs stored in the ROM 132 and executing a variety of processing. The RAM 133 is used as a main memory and a temporary storage area such as a work area for the CPU 131. The HDD 134 is a mass storage unit for storing the image data and various programs. The communication control unit 135 controls the communication of the cloud service 130 and the service management server 140 through the communication network 120, and establishes connection to the Internet.

The operation display unit 108 of the MFP 100 in the present embodiment is provided with a screen that can switch a home screen depending on usage scenes and use applications. The present embodiment will describe a case of using display in a tab format as a method of switching the home screen depending on the scenes (the use applications).

Figure 2:
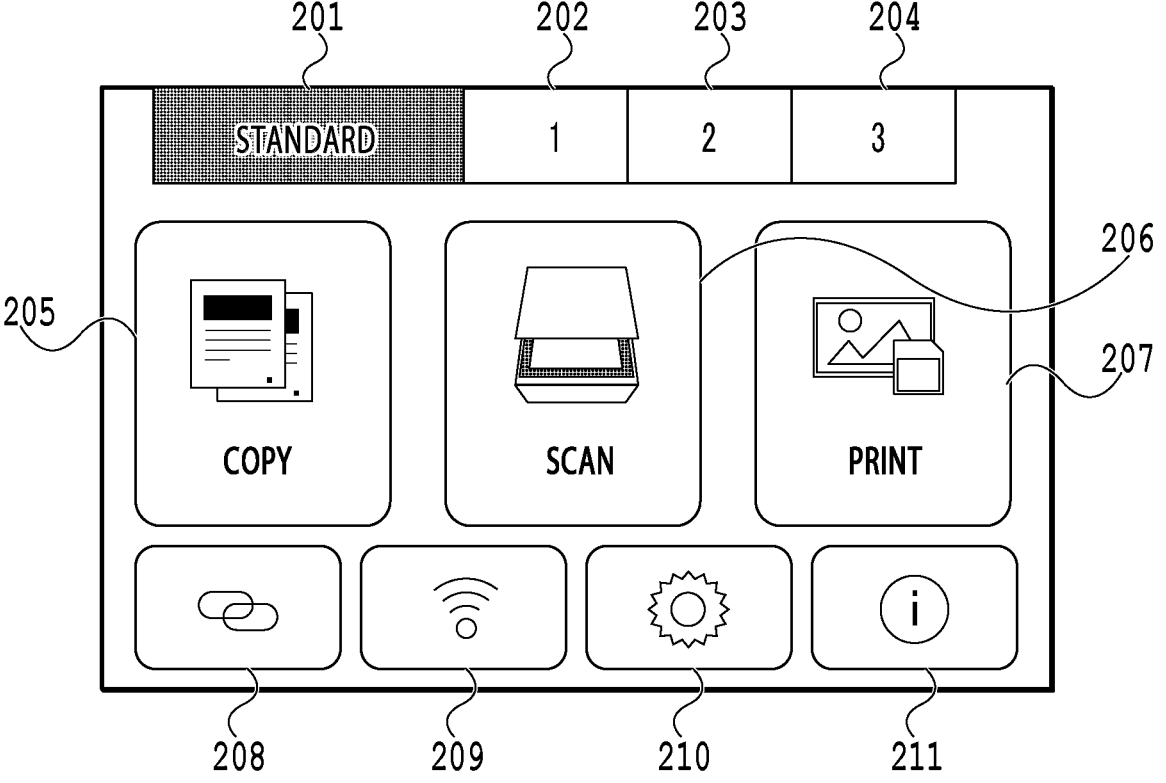
FIG. 2 is a diagram showing a standard home screen to be displayed on an operation display unit.

FIG. 2 is a diagram showing a standard home screen to be displayed on the operation display unit 108. A tab 201 is a tab corresponding to the standard home screen, and the standard home screen is a screen to display settings and standard functions of the MFP 100 as in the standard tab 201. Tabs 202, 203, and 204 are each a tab corresponding to a custom home screen. A user can switch the home screen by pressing any of the tabs. FIG. 2 indicates a state of display of the standard home screen by changing a tab color of the tab 201 to a different color from those of other tabs. By selecting and pressing any of the tabs other than the tab 201, the color of the selected tab is changed to a color different from those of other tabs, thus indicating a state of display of the custom home screen of the selected tab.

A copy menu button 205, a scan menu button 206, a print menu button 207, a LAN button 208, a wireless connection button 209, a setting button 210, and a clue button 211 are buttons corresponding to respective menus. The user presses these buttons in order to proceed to the respective menus.

FIGS. 3A to 3D are diagrams showing custom home screens corresponding to tabs 1, 2, and 3 displayed on the operation display unit 108. Custom menus 302, 303, 304, 306, 307, 308, 310, 311, and 312 are menus that can be customized by the user, and the user can designate functions to be displayed on respective menu positions. Each custom home screen can be categorized depending on a specific use application or depending on the user. A first custom home screen 301 is categorized in work applications, a second custom home screen 305 is categorized in study applications, and a third custom home screen 309 is categorized in life applications. Each custom home screen can arrange menus (functional options) frequently used in the relevant use application on the home screen. The custom home screen is the home screen that includes multiple functional options.

Figures 3A, 3B, 3C, 3D:
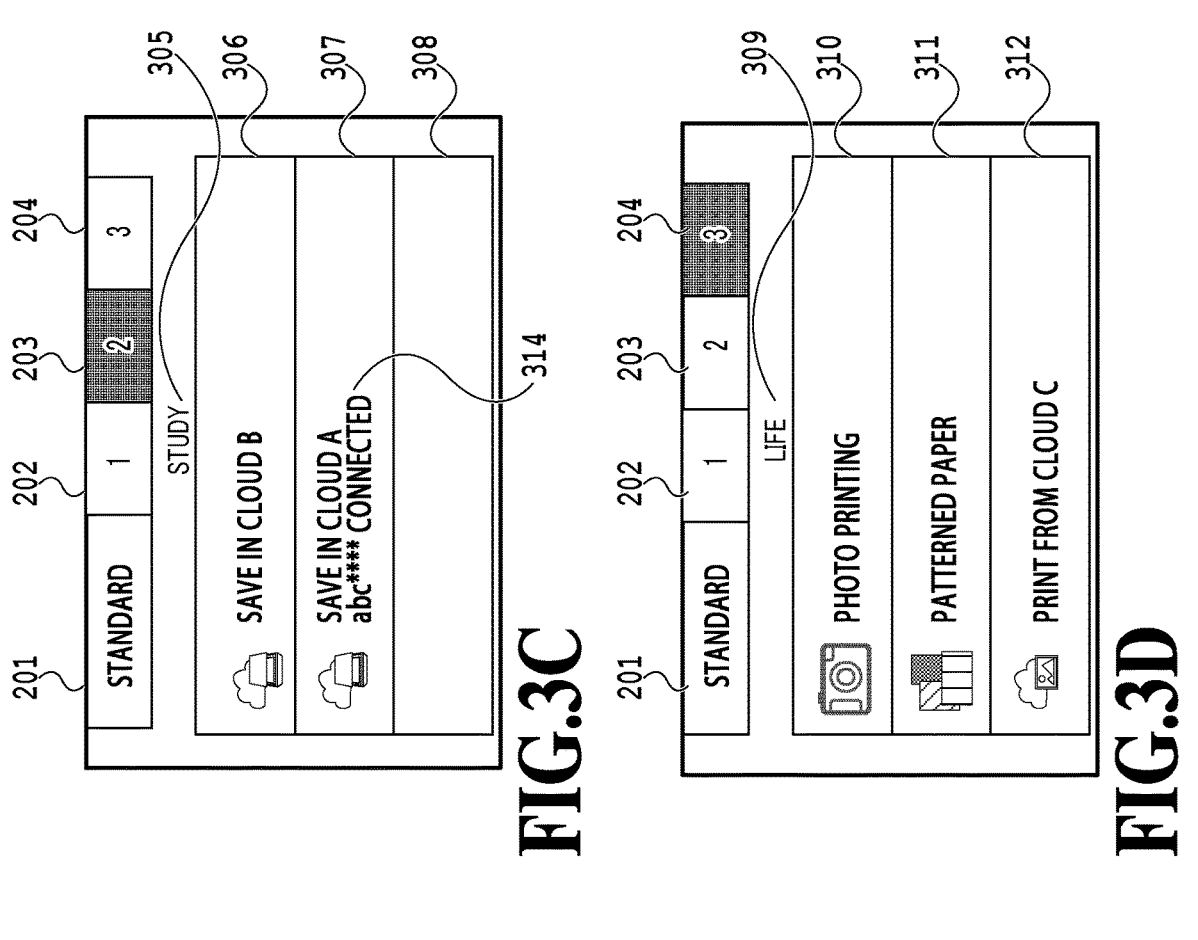
FIG. 3A is a diagram showing a custom home screen corresponding to a tab displayed on the operation display unit.
FIG. 3B is a diagram showing another custom home screen corresponding to the tab displayed on the operation display unit.
FIG. 3C is a diagram showing a custom home screen corresponding to another tab displayed on the operation display unit.
FIG. 3D is a diagram showing a custom home screen corresponding to still another tab displayed on the operation display unit.

The first custom home screen 301 in FIG. 3A deploys menus frequently used in a work scene on the home screen, and represents the custom home screen targeted for the work scene. The custom menu 302 is set to a "save in cloud A" function to save scanned data in a cloud service A being a destination of connection of an external service. The custom menu 303 is set to a "print from cloud A" function to print the data in the cloud service A. The custom menu 304 is set to a "save original in PC" function. In this way, it is possible to freely deploy the menus frequently used by the user in the work scene.

FIG. 3B shows an example of the screen in a case where the connection information necessary for connection to the cloud service A in the work scene in FIG. 3A has been saved already. Connection information 313 displays part of account information that has established communication from this custom home screen for the work scene. In this way, the screen indicates presence or absence of a connected amount.

The second custom home screen 305 in FIG. 3C deploys menus frequently used in a study scene on the home screen, and represents the custom home screen targeted for the study scene. The custom menu 306 is set to a "save in cloud B" function to save the scanned data in a cloud service B. The custom menu 307 is set to a "save in cloud A" function as with the custom menu 302. Nothing is registered with the custom menu 308. In this way, it is possible to freely deploy the menus frequently used by the user in the study scene. In the meantime, the same function can be deployed to different tabs as in the custom menus 302 and 307.

Meanwhile, the connection information 313 in FIG. 3B has the same function but different information on a connected account from that of connection information 314 in FIG. 3C. Although details will be described later, it is possible to retain the connection information on the tab basis, that is, depending on the scene, so that the connection information can be changed by switching the tab.

The third custom home screen 309 in FIG. 3D deploys menus frequently used in a life scene on the home screen, and represents the custom home screen targeted for the life scene. The custom menu 310 is set to a "photo printing" function, the custom menu 311 is set to a "patterned paper" function, and the custom menu 312 is set to a "print from cloud C" function. Thus, the custom menu deploys the menus frequently used in the life scene.

Figure 4:
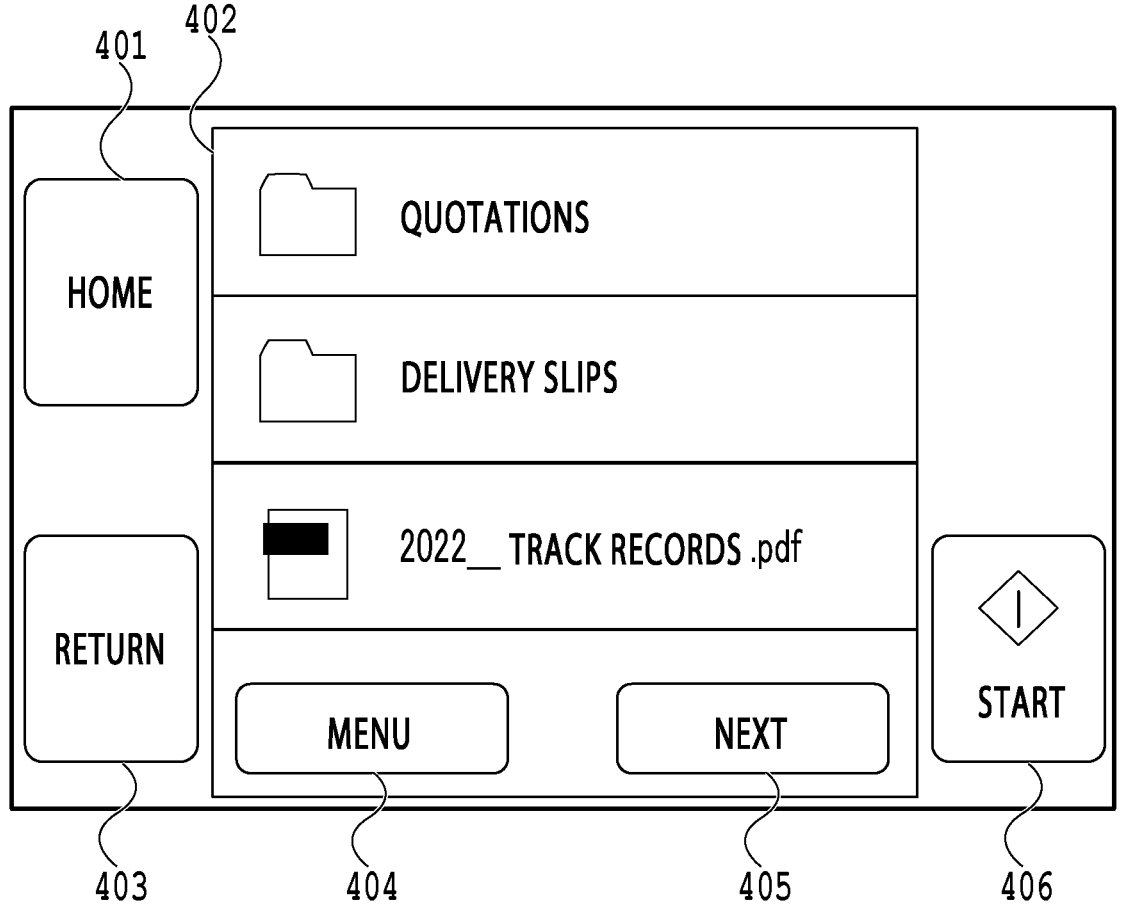
FIG. 4 is a screen for selecting holders and files on a cloud service side.

FIG. 4 shows a screen displayed on the operation display unit 108 of the MFP 100, which is a screen for selecting holders and files on a cloud service side in a case of saving data in the external service such as the cloud service or printing from the external service. A home button 401 is a button for returning to the home screen shown in FIG. 2. A list 402 is a list that displays folders and files in the cloud service. A return button 403 is a button for returning to a previous screen. An optional menu button 404 is a button leading to menus such as addition of a folder, detailed display of a file, cancellation of connection to the cloud service (deletion of the connection information), and the like.

A next button 405 is a button for determining the selected folder or file and transitioning to a scan setting screen or a print setting screen subsequent thereto. A start button 406 is a button for starting scanning or printing of the currently selected folder or file under default settings. As described above, after having connected to the external service, it is possible to display information on the user who establishes connection which is stored in the external service, and to use the scanning and printing functions. Accordingly, it is possible to lock each custom home screen in order to prevent the screen from being used by other people.

Figure 5A:
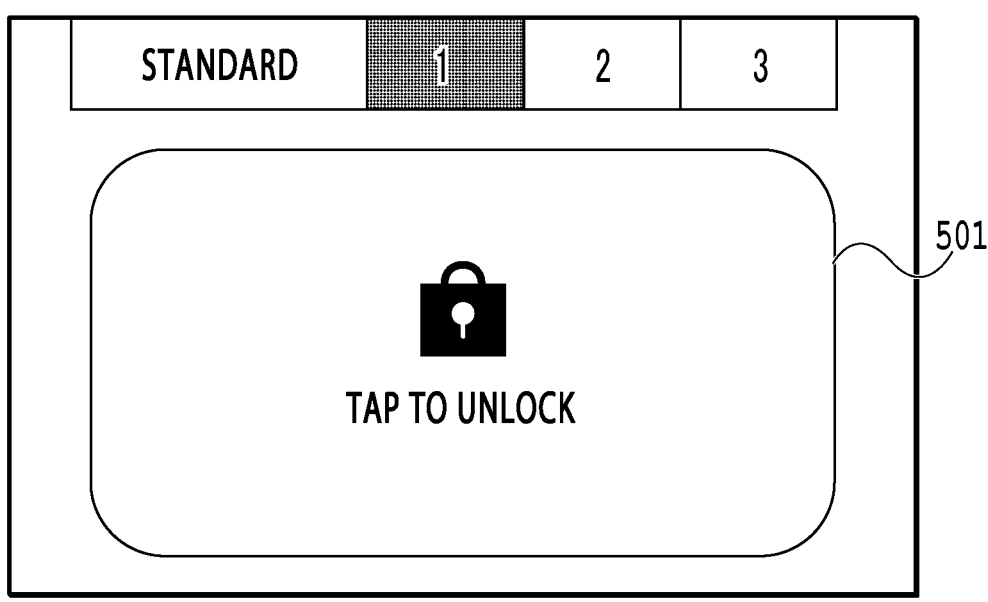
FIG. 5A is a diagram showing a lock screen for a tab 1 displayed on the operation display unit.
Figure 5B:
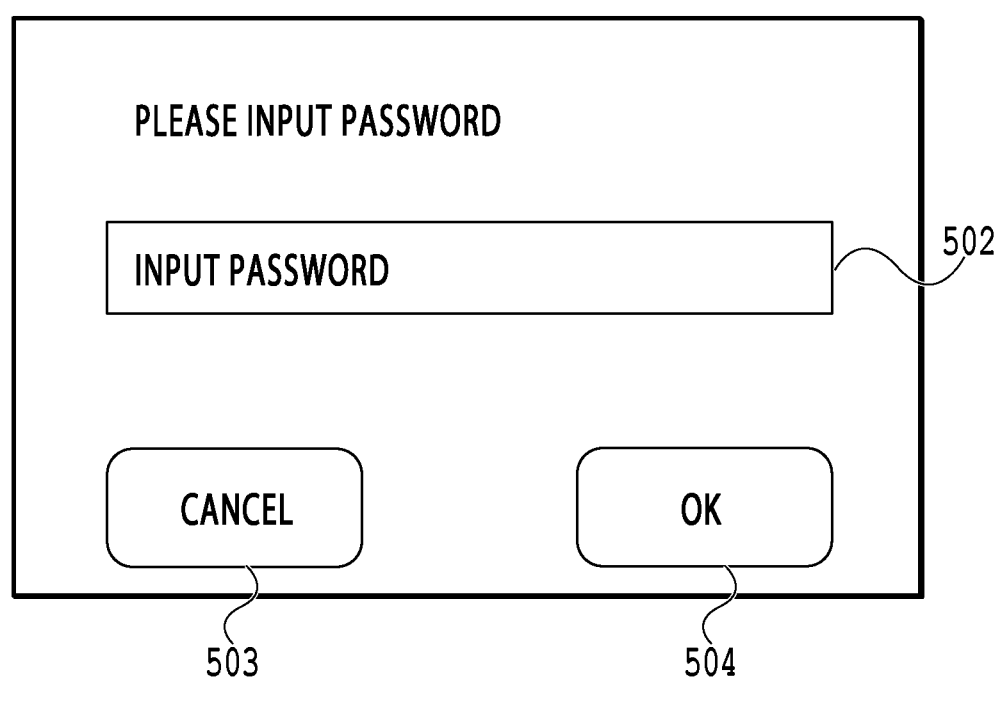
FIG. 5B is a diagram showing another lock screen for the tab 1 displayed on the operation display unit.

FIGS. 5A and 5B are diagrams showing lock screens for a tab 1 displayed on the operation display unit 108. In a case where the user selects the tab on the locked custom home screen, the lock screen shown in FIG. 5A is displayed instead of the custom home screen. A password input screen in FIG. 5B is displayed in a case where the user presses an unlock button 501. The user inputs a password set for the tab 1 in advance into a password input area 502. The inputted password is subjected to authentication as the user presses an OK button 504. The custom home screen is displayed in the case where the password is authenticated. The display returns to the screen in FIG. 5A without unlocking in the case where the user presses a cancel button 503.

Here, the lock screen shown in FIG. 5A is designed to lock the custom home screen and the input of the password in FIG. 5B is carried out for unlocking the screen. That is to say, the password for locking the screen is independent from the connection information to be described later. The settings of the custom menus 302 to 304, 306 to 308, and 310 to 312 on the custom home screens and the lock setting of the custom home screens are carried out by using setting button 210 in FIG. 2. Although details will be described later, it is also possible to activate the lock setting at the time of initial connection to the cloud service.

Figure 6:
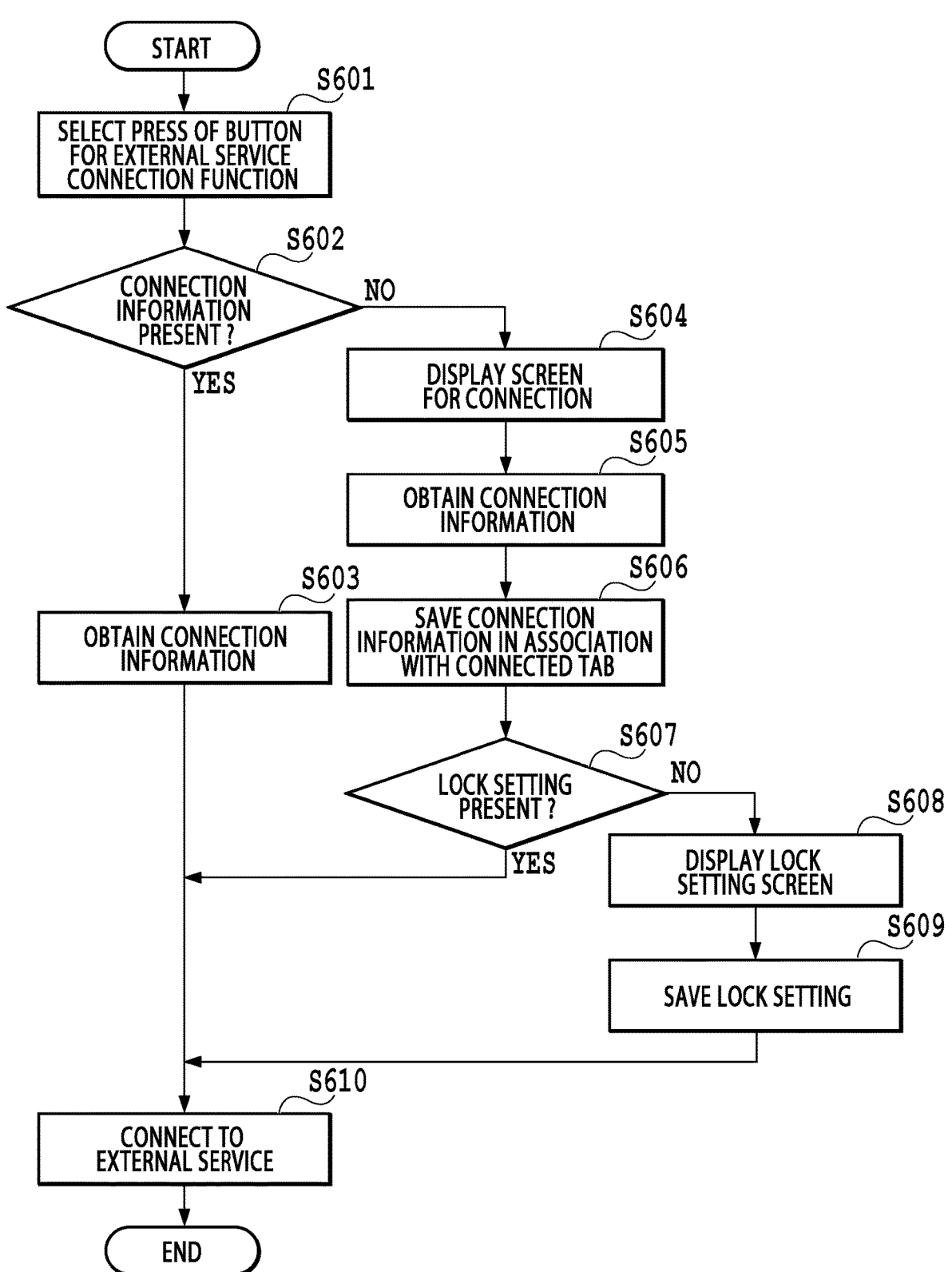
FIG. 6 is a flowchart showing a sequence of connection to an external service.
Figures 7A, 7B:
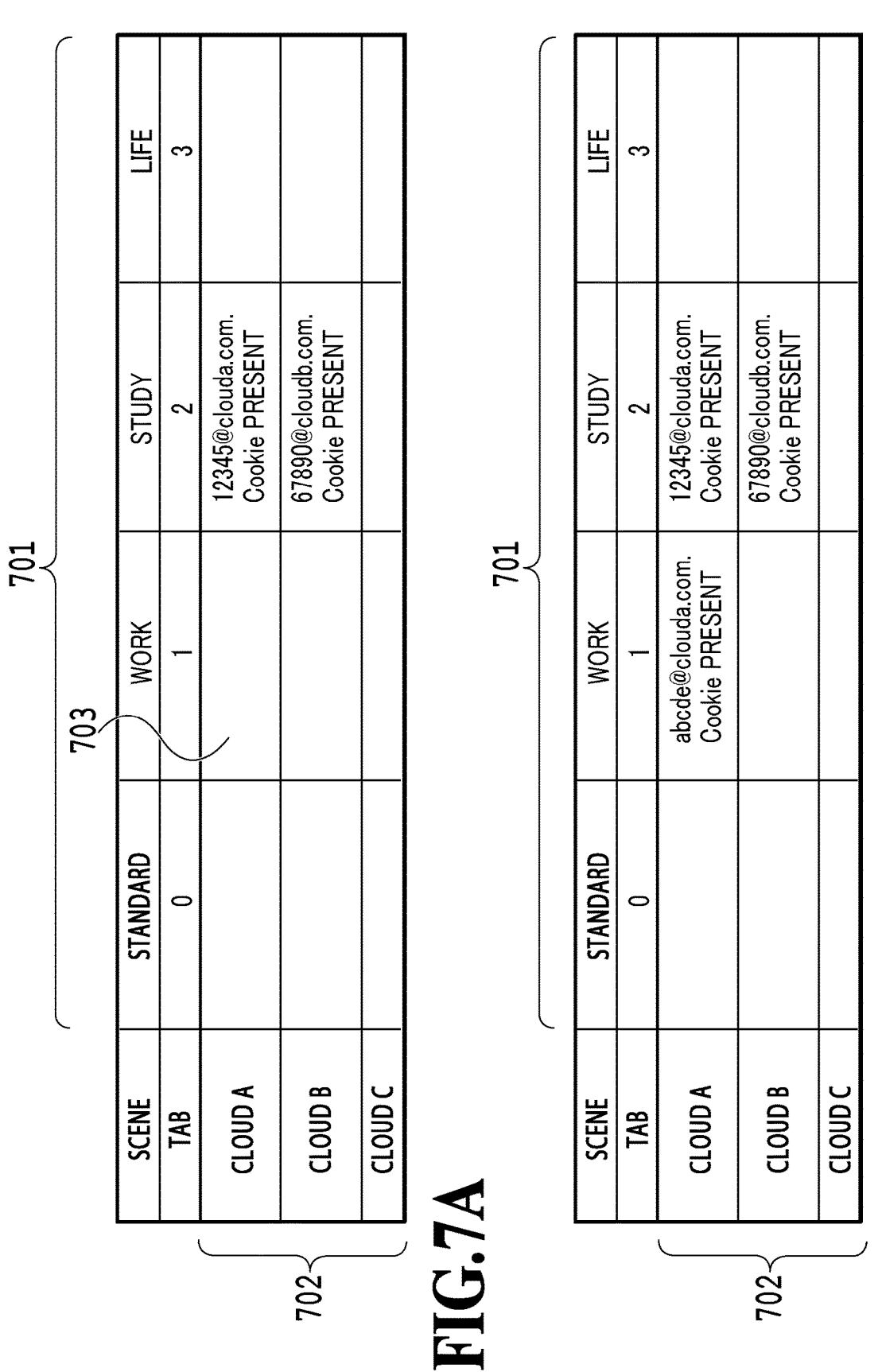
FIG. 7A is a diagram showing an example of connection information to be stored in a non-volatile memory.
FIG. 7B is a diagram showing another example of the connection information to be stored in the non-volatile memory.

FIG. 6 is a flowchart showing a sequence of connection to the external service. FIGS. 7A and 7B are diagrams showing examples of the connection information to be associated with the respective tabs and stored in the non-volatile memory 118. The processing in FIG. 6 is executed in a case where the user presses a button for a function on the menu on the home screen or the custom home screen, which requires a cooperation with the external service.

In the present embodiment, the menu screens of the respective scenes can be switched by using the tabs as shown in FIGS. 7A and 7B, so that the connection information can be registered in association with the respective menu screens. Note that the mode of switching the menu screens of the respective scenes is not limited to the tab format and the screens may be switched by using buttons and the like instead. Moreover, in a case where a user A wishes to carry out printing from the external service for a work purpose, for example, the connection information (authentication information) on an account of the user A is saved in advance so as to correspond to a WORK menu screen. In the meantime, in a case where a user B wishes to carry out printing from the external service for a study purpose, the connection information (the authentication information) on an account of the user B is saved in advance so as to correspond to a STUDY menu screen. In FIGS. 7A and 7B, the connection information on a cloud A and a cloud B is saved on the STUDY menu screen as the account of the user B. In this way, the respective users can establish connection to the external service with different accounts just by switching to the menu screen corresponding to the scene. Thus, it is possible to save the effort of repeated authentication for each account.

Now, processing of connection to the external service according to the present embodiment will be described below with reference to the flowchart in FIG. 6. A series of processing shown in FIG. 6 is carried out by causing the CPU 101 of the MFP 100 to load the program codes stored in the ROM 102 into the RAM 103 and to execute the program codes. Alternatively, part or all of the steps in FIG. 6 may be realized by hardware such as an ASIC and an electronic circuit. Note that code "S" in the description of each procedure means a step in the flowchart.

The CPU 101 detects the press of the button for the function to connect to the external service in S601, and determines whether or not connection information on the external service selected by the user is stored in association with the scene being displayed in S602. The processing proceeds to S603 in the case where the connection information is present (yes), or proceeds to S604 in the case where the connection information is absent (no). Here, the connection information is information necessary for access to the service at the destination of connection as typified by the account, the password, an access token, a cookie, and the like.

As shown in FIG. 7A, connection information 702 on each external service is stored in association with an item 701 of each scene. The user presses the menu 302 or 303 (see FIG. 3A) of the cloud A on the menu screen (the tab 1) for the work scene. In this case, the connection information on the cloud A is not retained regarding the item (the tab 1) of the work scene in FIG. 7A (see an area 703). Therefore, the determination in S602 turns out to be no and the processing proceeds to S604.

After proceeding to S604, the CPU 101 displays a screen necessary for connection to the cloud A. In the case where a log-in screen for the external service can be directly displayed on the operation panel, the log-in screen for the external service is displayed as the screen necessary for connection. As the logging in to the external service is completed and the user permits connection of the external service to the user's account from the MFP 100, the access token or the cookie necessary for connection is issued. The logging in may be carried out through the service management server 140 instead of displaying the log-in screen for the external service on the operation display unit 108. In this case, the URL for establishing connection is displayed on the screen so as to allow the user to access the URL from another terminal such as a PC, thereby logging in to the external service. The access token or the cookie necessary for connection is issued in the case where the user logs in to the external service and authorizes the access from the MFP 100 to the external service.

Then, the CPU 101 causes the MFP 100 to obtain the information (such as the cookie) necessary for connection to the external service either directly or through the service management server 140 in S605. Then, the CPU 101 saves the connection information on the external service in S606 while associating the information with the scene being displayed in order to use the information in the next connection and so on. FIG. 7B shows a state where the connection information on the cloud A is stored in the item (the tab 1) for the work scene. In order to simplify the explanation, FIG. 7B shows an example of saved information consisting of a mail address and a cookie as the connection information.

At a timing of retaining the connection information on the cloud service, part of the connection information may be displayed on the buttons as shown in the connection information 313 in FIG. 3B. Aside from the buttons, the connection information may be displayed near the titles in the tabs, blank spaces, and the like. As shown in the connection information 313, only partial information on the account may be displayed so as not to allow other people to obtain the name of the account or the mail address. Alternatively, information may be displayed by using a color or an icon in a case where the information enables the user to determine whether or not connection has been established or whether or not the account belongs to the user.

Thereafter, in S607, the CPU 101 determines presence or absence of the lock setting of the tab on which the connection information is newly stored. In S607, the determination turns out to be no in the case where there is no lock setting by using the password. Here, the processing proceeds to S608 to display a lock setting screen. Regarding the lock setting screen, a selection screen to cause the user to select whether or not to activate the lock setting is displayed on the operation display unit 108. In the case where the user activates the lock setting by using the password on the lock setting screen, the password input screen in FIG. 5B is displayed so as to allow the user to set up a desired password. Upon input of the password, the CPU 101 associates the password with the tab and stores the password in S609. In the case where the tab is locked with the password as mentioned above, the password needs to be inputted in order to display the tab. Accordingly, in the case where the external service contains confidential information on work that is not supposed to be browsed/used by other people, for example, the use by other people can be prevented by locking the tab. Moreover, in S610, the CPU 101 establishes connection to the external service by using the connection information obtained in S606, and displays the information on the folders and the files of the external service as shown in FIG. 4. Then, the processing is terminated.

In the case of using the menus 302 and 303 in the next connection and so on, the determination in S602 turns out to be yes since the connection information on the cloud A regarding the item (the tab 1) of the work scene is retained as shown in FIG. 7B. In S603, the connection information on the cloud A regarding the item (the tab 1) of the work scene is obtained. Then, the use of the connection information in S603 enables display of the information in the external service while skipping the log-in operation to the external service or the access authorization operation.

Next, a description will be given of a case in which the external service corresponding to the press by the user is the menu 307 in FIG. 3C. It is apparent from FIGS. 7A and 7B that the cloud A of the item (a tab 2) of the study scene has stored the connection information already. Accordingly, the determination in S602 turns out to be yes. The connection information already retained in the tab is obtained in S603. Thereafter, the access to the external service is carried out in S610 by using the connection information obtained in S603.

As apparent from FIG. 7B, the connection information used for the access in this instance represents the account that is different from that of the item (the tab 1) of the work scene. By saving the connection information on the external service in association with each scene as mentioned above, it is possible to change the account to be connected to the external service easily by switching the scene without using the authentication management by the MFP 100.

So far, the description has been given of the mode of retaining the connection information on the external service depending on the scene. Instead, it is also possible to set such that the connection information is not retained regarding a particular scene (tab). For example, the screen such as the standard tab 201 that displays settings and standard functions of the MFP 100 is assumed to be used by multiple users. In this case, if the connection information on a specific user is stored, the relevant connection information has to be deleted and then connection needs to be established again in the case where another user uses the screen. This operation is cumbersome. In the meantime, in consideration of the possible use by other people, the locking operation of the tab is not assumed to be used therein. In this regard, it is not desirable to leave the external service containing the confidential information in an accessible state. Given the circumstances, a particular scene (tab) may be set not to retain the connection information. Alternatively, appropriateness of saving the connection information may be set depending on the usage scene or on the use application (on the tab basis).

Figure 8:
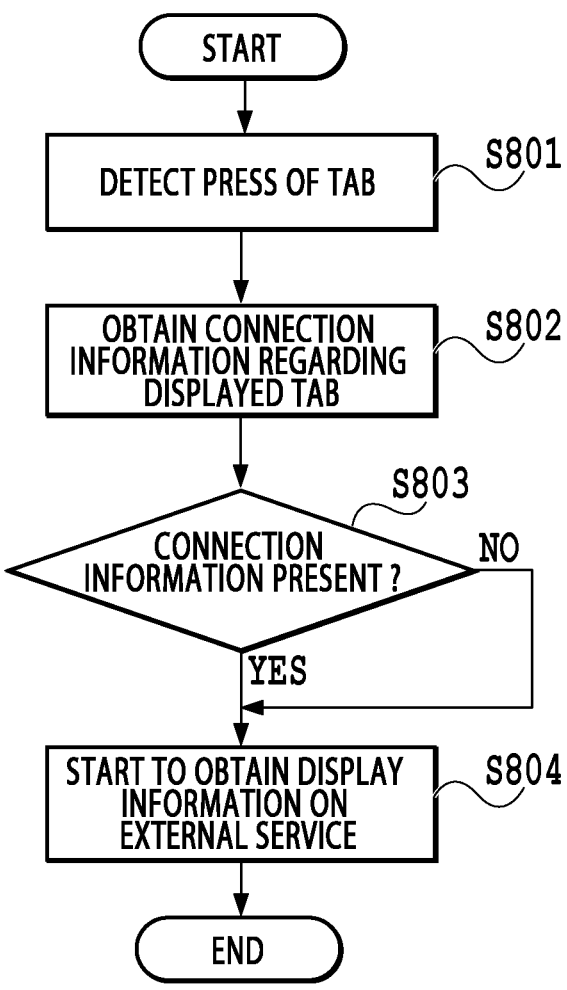
FIG. 8 is a flowchart showing connection processing to the external service.

FIG. 8 is a flowchart showing connection processing to the external service, which is to be carried out in the background and in parallel to the connection processing to the external service in FIG. 6. A description will be given below of a case in which the user selects the work scene and the menu screen in FIG. 3B is displayed by the press of the tab 1. Now, a sequence of the connection to the external service in the present embodiment will be described below with reference to the flowchart in FIG. 8. A series of processing shown in FIG. 8 is carried out by causing the CPU 101 of the MFP 100 to load the program codes stored in the ROM 102 into the RAM 103 and to execute the program codes. Alternatively, part or all of the steps in FIG. 8 may be realized by hardware such as an ASIC and an electronic circuit. Note that code "S" in the description of each procedure means a step in the flowchart.

The CPU 101 detects the number of the tab corresponding to the scene selected by the user in S801. Next, in S802, the CPU 101 obtains the connection information on the external service retained for the selected scene. In this instance, in the case where the retained connection information is in the state shown in FIG. 7B, the determination of the presence or absence of the connection information in S803 turns out to be yes since the connection information on the cloud A is retained regarding the item of the work scene. Next, the CPU 101 accesses the external service in S804 by using the connection information, and starts to obtain the information on the external service. The information on the external service to be obtained in this case is the information on the folders and the files of the external service in FIG. 4, which are displayed in the case where the user presses the menu 302 or 303 (see FIG. 3B) on the menu screen (the tab 1) for the work scene. In the case where there is no connection information retained in association with the item of the work scene as in FIG. 7A, the determination in S803 turns out to be no and the operation to obtain the external service information in advance in S804 is not executed.

By starting to obtain the information on the external service at the timing of the press of the tab as described above, it is possible to display the screen in FIG. 4 promptly after the user presses the menu for connection to the external service. It is possible to reduce consumption of time to establish connection to the external service or to obtain the data in a case where a network environment is not good such as a use-at-home environment, or in a case where the MFP 100 is inexpensive and has low specifications.

The present embodiment has described the configuration to associate the connection information on the external service with the menu screen of each scene, and to switch the account to be connected to the external service by changing the scene. However, the present invention is not limited to this configuration. For example, the connection information on the external service may be associated with each tab. In this way, it is possible to switch the account to be connected to the external service by changing the tab.

Moreover, the connection information thus registered may be subject to deletion after a lapse of an arbitrary period. Such an arbitrary period may be set up by the user. In this way, it is possible to keep the information from remaining forever in the apparatus, thereby suppressing information leakages.

As described above, connection to the external service is established based on the connection information associated with the menu screen displayed on the display unit. Thus, it is possible to provide an information processing apparatus, a controlling method, and a storage medium, which are capable of suppressing a decrease in operating efficiency in a case of using an external service.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-134095, filed Aug. 25, 2022, which is hereby incorporated by reference wherein in its entirety.

What is claimed is:

1. An information processing apparatus comprising:
   a display control unit capable of selectively displaying a plurality of menu screens including a first menu screen and a second menu screen different from the first menu screen on a display unit, wherein buttons to perform a plurality of functions including a copy function and a scan function can be displayed on the first menu screen and buttons to perform a plurality of functions including a copy function and a scan function can be displayed on the second menu screen;
   an association unit configured to associate the first menu screen with first authentication information to establish connection to an external service and associate the second menu screen with second authentication information different from the first authentication information to establish the connection to the external service; and
   a connection unit configured to establish the connection to the external service based on the first authentication information associated with the first menu screen displayed on the display unit in a case where an instruction to connect to the external service is accepted on the first menu screen and establish the connection to the external service based on the second authentication information associated with the second menu screen displayed on the display unit in a case where the instruction to connect to the external service is accepted on the second menu screen.

2. The information processing apparatus according to claim 1, wherein
   the first and second menu screens each include a functional option for executing a function, and
   in a case where the functional option is selected on one of the first menu screen or the second menu screen, the connection unit establishes connection to the external service based on the connection information associated with the menu screen on which the functional option is selected.

3. The information processing apparatus according to claim 2, wherein
   the first and second menu screens each include a plurality of the functional options, and
   the connection unit establishes connection to the external service corresponding to the selected functional option based on the connection information associated with the menu screen on which the functional option is selected and associated with the selected functional option.

4. The information processing apparatus according to claim 1, wherein the plurality of menu screens are provided corresponding to scenes to be used.

5. The information processing apparatus according to claim 4, wherein the plurality of menu screens at least correspond to a work scene, a study scene, and a life scene.

6. The information processing apparatus according to claim 1, further comprising:
   a switching unit configured to switch one of the menu screens displayed on the display unit to another one of the menu screens; and
   an information obtaining unit configured to obtain information on the external service based on the connection information associated with the other one of the menu screens to be newly displayed on the display unit as a consequence of switching in a case where the switching is carried out by the switching unit.

7. The information processing apparatus according to claim 6, wherein
   the plurality of menu screens each include a functional option for executing a function,
   in a case where the functional option is selected on one of the plurality of menu screens, the connection unit establishes connection to the external service based on the connection information associated with the menu screen on which the functional option is selected, and
   the information obtaining unit obtains the information on the external service in a state where the functional option is not selected.

8. The information processing apparatus according to claim 4, wherein the information processing apparatus is capable of setting whether or not to retain the connection information associated with the menu screen on which the instruction is accepted depending on the scene to be used.

9. The information processing apparatus according to claim 1, further comprising:
   a switching unit configured to switch one of the menu screens displayed on the display unit to another one of the menu screens,
   wherein the switching of the menu screens is caused by a user selecting a tab displayed in a tab format.

10. The information processing apparatus according to claim 1, further comprising:
   a switching unit configured to switch one of the menu screens displayed on the display unit to another one of the menu screens; and
   a lock setting unit configured to lock switching by the switching unit with a password.

11. The information processing apparatus according to claim 10, further comprising:
   a selection unit configured to select whether or not to activate a lock setting by the lock setting unit.

12. The information processing apparatus according to claim 11, wherein the selection unit causes the display unit to display a selection screen that causes a user to select whether or not to activate the lock setting in a case where connection information associated with the menu screen is retained.

13. A method of controlling an information processing apparatus provided with
   a display control unit capable of selectively displaying a plurality of menu screens including a first menu screen and a second menu screen different from the first menu screen on a display unit, wherein buttons to perform a plurality of functions including a copy function and a scan function can be displayed on the first menu screen and buttons to perform a plurality of functions including a copy function and a scan function can be displayed on the second menu screen,
   the method of controlling the information apparatus comprising:
   an associating step of associating the first menu screen with first authentication information to establish connection to an external service and associating the second menu screen with second authentication information different from the first authentication information to establish the connection to the external service; and
   a connecting step of establishing the connection to the external service based on the first authentication information associated with the first menu screen displayed on the display unit in a case where an instruction to connect to the external service is accepted on the first menu screen and establishing the connection to the external service based on the second authentication information associated with the second menu screen displayed on the display unit in a case where the instruction to connect to the external service is accepted on the second menu screen.

14. A non-transitory computer-readable storage medium storing a program for causing a computer to execute a method of controlling an information processing apparatus provided with a display control unit capable of selectively displaying a plurality of menu screens including a first menu screen and a second menu screen different from the first menu screen on a display unit, wherein buttons to perform a plurality of functions including a copy function and a scan function can be displayed on the first menu screen and buttons to perform a plurality of functions including a copy function and a scan function can be displayed on the second menu screen, the storage medium causing the computer to execute the method of controlling the information processing apparatus comprising:

an associating step of associating the first menu screen with first authentication information to establish connection to an external service and associating the second menu screen with second authentication information different from the first authentication information to establish the connection to the external service; and a connecting step of establishing the connection to the external service based on the first authentication information associated with the first menu screen displayed on the display unit in a case where an instruction to connect to the external service is accepted on the first menu screen and establishing the connection to the external service based on the second authentication information associated with the second menu screen displayed on the display unit in a case where the instruction to connect to the external service is accepted on the second menu screen.

15. The information processing apparatus according to claim 1, wherein the first authentication information and the second authentication information are account information to connect to the external service.

16. The information processing apparatus according to claim 1, wherein on the first menu screen and the second menu screen, buttons to accept the instruction to connect to the external service can be displayed.

17. The information processing apparatus according to claim 1, wherein the connection unit establishes the connection to the external service based on the first authentication information associated with the first menu screen without receiving input of the first authentication information in a case where the instruction to connect to the external service is accepted on the first menu screen displayed on the display unit and the first authentication information is associated with the first menu screen, and the connection unit establishes the connection to the external service based on the second authentication information associated with the second menu screen without receiving input of the second authentication information in a case where the instruction to connect to the external service is accepted on the second menu screen displayed on the display unit and the second authentication information is associated with the second menu screen.

* * * * *